United States Patent
Kobayashi et al.

(10) Patent No.: US 12,448,734 B2
(45) Date of Patent: Oct. 21, 2025

(54) PAPER-STRENGTHENING AGENT, PAPER, AND METHOD OF PRODUCING PAPER

(71) Applicant: ARAKAWA CHEMICAL INDUSTRIES, LTD., Osaka (JP)

(72) Inventors: Makoto Kobayashi, Osaka (JP); Teruaki Sato, Osaka (JP); Tetsu Mizuko, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 798 days.

(21) Appl. No.: 17/642,296

(22) PCT Filed: Sep. 15, 2020

(86) PCT No.: PCT/JP2020/034912
§ 371 (c)(1),
(2) Date: Mar. 11, 2022

(87) PCT Pub. No.: WO2021/060073
PCT Pub. Date: Apr. 1, 2021

(65) Prior Publication Data
US 2022/0341095 A1    Oct. 27, 2022

(30) Foreign Application Priority Data
Sep. 26, 2019   (JP) ................ 2019-176254

(51) Int. Cl.
*D21H 17/45*    (2006.01)
*D21H 21/18*    (2006.01)

(52) U.S. Cl.
CPC ............ *D21H 17/45* (2013.01); *D21H 21/18* (2013.01)

(58) Field of Classification Search
CPC ............................... D21H 17/45; D21H 21/18
See application file for complete search history.

(56) References Cited

U.S. PATENT DOCUMENTS

| | | | | |
|---|---|---|---|---|
| 7,141,181 B2* | 11/2006 | Mori | ................... | B01D 21/01 |
| | | | | 162/168.3 |
| 2005/0272889 A1* | 12/2005 | Kiyosada | ............... | C08F 20/60 |
| | | | | 526/287 |
| 2008/0230193 A1* | 9/2008 | Mori | ................... | D21C 5/027 |
| | | | | 210/639 |

FOREIGN PATENT DOCUMENTS

| | | |
|---|---|---|
| JP | H05-78997 A | 3/1993 |
| JP | H8-188982 A | 7/1996 |
| JP | 2002-514674 A | 5/2002 |
| JP | 2012251252 A | 12/2012 |
| JP | 2014-196588 A | 10/2014 |
| JP | 2015-52194 A | 3/2015 |
| JP | 2017-186725 A | 10/2017 |
| WO | 9958609 A1 | 11/1999 |

OTHER PUBLICATIONS

International Search Report dated Nov. 10, 2020; International Application No. PCT/JP2020/034912.

* cited by examiner

*Primary Examiner* — Jacob T Minskey
(74) *Attorney, Agent, or Firm* — Dinsmore & Shohl LLP

(57) ABSTRACT

A paper-strengthening agent comprising an amphoteric (meth)acrylamide polymer and an amphoteric (meth)acrylamide polymer, wherein each of constituent monomers of the amphoteric (meth)acrylamide polymer and the amphoteric (meth)acrylamide polymer comprises (meth)acrylamide, a cationic unsaturated monomer, an anionic unsaturated monomer, and a crosslinkable unsaturated monomer, and has a specific weight-average molecular weight, and wherein each viscosity of the paper-strengthening agent, the polymer, and the polymer satisfies a specific relationship.

7 Claims, No Drawings

PAPER-STRENGTHENING AGENT, PAPER, AND METHOD OF PRODUCING PAPER

CROSS-REFERENCE TO RELATED APPLICATIONS

This application is the U.S. National Stage of PCT/JP2020/034912 filed Sep. 15, 2020, which claims priority to Japanese Patent Application 2019-176254 filed on Sep. 26, 2019, the entire content of both are incorporated herein by reference in their entirety

FIELD OF THE INVENTION

The present invention relates to a paper-strengthening agent, paper and a method of producing paper.

BACKGROUND OF THE INVENTION

Paper has been utilized as a recyclable resource for various applications. In the paper industry, as part of environmental measures, recycling of a used paper and reduction of a water consumption (closed system) have been tackled. However, if used paper is continuously recycled, fibrils on a pulp surface will decrease, and interfiber bonds in paper will decrease. Furthermore, strength of a pulp fiber itself will be also reduced, and therefore strength of the obtained paper will be reduced. As a result, a paper-strengthening agent becomes indispensable one for compensating for decrease in strength during papermaking.

In addition, as recycling of used paper and closed system develop, fine fibers and dissolved electrolyte substances are accumulated in a papermaking system. Therefore, an electrical conductivity of the papermaking system tends to increase. Among dissolved electrolyte substances, calcium ions are particularly abundant. Calcium ions are not only originally contained in papermaking white water, but also generated from calcium carbonate added into a pulp slurry, enhancing the electrical conductivity of the papermaking system. The electrical conductivity is increasing even when it exceeds 4 mS/cm. Under such circumstances, an amphoteric paper-strengthening agent is difficult to exhibit an original paper-strengthening effect because an ion portion is shielded by a dissolved electrolyte such as a calcium ion. A (meth)acrylamide-based polymer is used as a paper-strengthening agent for one of such papermaking additives.

The (meth)acrylamide-based polymer can be classified into an anionic type, a cationic type, or an amphoteric type according to ionicity thereof. Currently, the amphoteric type is mainly used. The amphoteric type (meth)acrylamide-based polymer is obtained by copolymerizing acrylamide with various polymerization components such as a cationic monomer and an anionic monomer. The (meth)acrylamide-based polymer has an isoelectric point and forms a polyion complex (hereinafter, referred to as "PIC") at a pH near the isoelectric point. The isoelectric point refers to a pH at which an electric charge of a polymer as a whole becomes 0 when the pH is changed, and PIC refers to a water-insoluble substance formed by bonding polymers having anionic or cationic groups by ionic bond. When PIC is formed, a phenomenon of cloudiness is observed, and further, a non-uniform state may be created or an insoluble substance may be generated. By forming PIC, the (meth)acrylamide-based polymer is known to exhibit a paper-strengthening effect.

The amphoteric (meth)acrylamide-based polymer used in a papermaking environment having a high electrical conductivity is, for example, a polymer of a polymerization component comprising a specific amount of (meth)acrylamide, a cationic vinyl monomer, and an anionic vinyl monomer, and a polyacrylamide-based internal paper-strengthening agent in which a weight-average molecular weight, a ratio of the weight-average molecular weight to a viscosity, and a spinnability all show specific values (Patent Document 1).

PRIOR ART DOCUMENT

Patent Document

Patent Document 1: JP 2012-251252 A

SUMMARY OF THE INVENTION

However, it could not be said that a paper-strengthening effect of paper obtained by using the paper-strengthening agent described in Patent Document 1 was sufficient.

It is an object of the present invention to provide a paper-strengthening agent that exhibits a high paper-strengthening effect even when paper is made in a paper-making environment (pulp slurry) having a high electrical conductivity.

The present inventors conducted intensive studies focusing a viscosity value at the time of forming PIC as physical characteristics of the paper-strengthening agent. Then, the present inventors have found that a paper-strengthening agent can be provided by which paper exhibiting an excellent paper-strengthening effect can be obtained not only in a papermaking environment with a low electrical conductivity (less than 3 mS/cm) but also in a papermaking environment with a high electrical conductivity (3 mS/cm or more), when a viscosity upon mixing of a plurality of amphoteric (meth)acrylamide-based polymers is equal to or greater than an arithmetic mean of a value indicated by each polymer, and completed the present invention.

The paper-strengthening agent of the present invention that solves the above-described problem comprises an amphoteric (meth)acrylamide polymer (A1) and an amphoteric (meth)acrylamide polymer (A2), wherein each of constituent monomers of the amphoteric (meth)acrylamide polymer (A1) and the amphoteric (meth)acrylamide polymer (A2) comprises (meth)acrylamide (a1), a cationic unsaturated monomer (a2), an anionic unsaturated monomer (a3), and a crosslinkable unsaturated monomer (a4), wherein each of weight-average molecular weights of the amphoteric (meth)acrylamide polymer (A1) and the amphoteric (meth)acrylamide polymer (A2) is 1,500,000 to 10,000,000, and wherein, where a viscosity (25° C.) of an aqueous solution (pH: 4) of 15% by mass of paper-strengthening agent is defined as $X_A$ mPa·s, a viscosity (25° C.) of an aqueous solution (pH: 4) of the amphoteric (meth)acrylamide polymer (A1) with 15% by mass of concentration is defined as $X_{A1}$ mPa·s, and a viscosity (25° C.) of an aqueous solution (pH: 4) of the amphoteric (meth)acrylamide polymer (A2) with 15% by mass of concentration is defined as $X_{A2}$ mPa·s, the paper-strengthening agent satisfies the following inequality 1:

$$1.1 \leq X_A/(m_{A1} \times X_{A1} + m_{A2} \times X_{A2}) \leq 6 \quad \text{(Inequality 1)}$$

(wherein, $m_{A1}$ is a ratio of a solid content weight of the amphoteric (meth)acrylamide polymer (A1) to a total weight of the amphoteric (meth)acrylamide polymer (A1) and the amphoteric (meth)acrylamide polymer (A2), $m_{A2}$ is a ratio of a solid content weight of the amphoteric (meth)acrylamide polymer (A2) to the total weight of the amphoteric (meth)acrylamide polymer (A1) and the amphoteric (meth)acrylamide polymer (A2), and $m_{A1}+m_{A2}=1$.)

The paper of the present invention that solves the above-described problem is paper obtained by using the above-described paper-strengthening agent.

The method of producing paper of the present invention that solves the above-described problem is a method of producing paper, the method comprising adding the above-described paper-strengthening agent to a pulp slurry.

Embodiment for Carrying Out the Invention

The paper-strengthening agent of one embodiment of the present invention (a paper-strengthening agent (A)) comprises two kinds of amphoteric (meth)acrylamide-based polymers (A1) (hereinafter referred to as a polymer (A1)) and (A2) (hereinafter referred to as a polymer (A2)) and satisfies all of the specific conditions (1) to (3). The details will be described below.

<Paper-Strengthening Agent (A)>

The paper-strengthening agent (A) comprises the above-described polymer (A1) and polymer (A2) and is obtained by mixing them.

Upon production of a "mixed product" of the polymer (A1) and the polymer (A2) in a system by mixing the above-described polymers, a viscosity of the paper-strengthening agent (A) shows a value equal to or greater than an arithmetic mean of a viscosity of the polymer (A1) and a viscosity of the polymer (A2). The "product" here refers to one in which a cation-derived component and an anion-derived component contained in the polymers (A1) or (A2), respectively, electrically interact with each other to form a PIC. When the PIC is formed, the viscosity of the paper-strengthening agent generally increases. In this case, in the present embodiment, the viscosity of the paper-strengthening agent (A) shows a value higher than an arithmetic mean value of a viscosity of the polymer (A1) and a viscosity of the polymer (A2) as will be described later. With this relationship being satisfied, the obtained paper exhibits a high paper-strengthening effect when the paper-strengthening agent (A) is used in a papermaking environment with a high electrical conductivity.

Besides, a polymer (A1) and a polymer (A2) may be contained in the paper-strengthening agent (A).

A weight ratio of the polymer (A1) to the polymer (A2) is not particularly limited. By way of an example, the weight ratio of the polymer (A1) to the polymer (A2) is preferably (A1)/(A2)=95/5 to 5/95, more preferably (A1)/(A2)=85/15 to 15/85, further preferably (A1)/(A2)=75/25 to 40/60, in solid content weight, from the viewpoints of easily forming a PIC, suppressing a formation disturbance of paper, and exhibiting an excellent paper-strengthening effect.

Moreover, a mixing method is not particularly limited. By way of an example, the mixing method is a method of mixing a polymer (A1) and a polymer (A2) at room temperature and stirring the mixture with a stirrer, etc. for a certain period of time, or the like. Besides, water (for example, a deionized water, etc.) may be added at the time of preparation, and heating or cooling may be performed at the time of mixing.

Moreover, to the paper-strengthening agent (A), polymers such an amphoteric (meth)acrylamide polymer, a cationic (meth)acrylamide polymer, and an anionic (meth)acrylamide, other than the polymer (A1) and the polymer (A2); organic acids such as citric acid, succinic acid, and oxalic acid; inorganic acids such as hydrochloric acid, sulfuric acid, and phosphoric acid; inorganic bases such as sodium hydroxide, potassium hydroxide, and calcium hydroxide; a water-soluble aluminum compound, a Glauber's salt (sodium sulfate), urea, polysaccharides (for example, starch), an anti-foaming agent, an antioxidant, a polymerization inhibitor, a preservative, and the like may be added.

Next, the conditions (1) to (3) will be described in turn.

<Condition (1)>

The condition (1) defines constituent monomers of the polymer (A1) and the polymer (A2).

The constituent monomers of the polymer (A1) and the polymer (A2) both include (meth)acrylamide (a1) (hereinafter referred to as an (a1) component), a cationic unsaturated monomer (a2) (hereinafter, referred to as an (a2) component), an anionic unsaturated monomer (a3) (hereinafter referred to as an (a3) component), and a crosslinkable unsaturated monomer (a4) (hereinafter referred to as an (a4) component). Besides, "(meth)acryl" means methacryl and acryl. Moreover, "unsaturated monomer" means one having a double bond or a triple bond in one molecule.

The (a1) component includes methacrylamide and acrylamide. The (a1) component may be used in combination.

The (a2) component is not particularly limited as long as it has cationic properties. By way of an example, the (a2) component is an unsaturated monomer having a secondary amino group, an unsaturated monomer having a tertiary amino group, quaternized salts of these unsaturated monomers, or the like.

The unsaturated monomer having a secondary amino group is not particularly limited. By way of an example, the unsaturated monomer having a secondary amino group is diallylamine or the like. The unsaturated monomer having a tertiary amino group is not particularly limited. By way of an example, the unsaturated monomer having a tertiary amino group is (meth)acrylate having a tertiary amino group such as N,N-dimethylaminoethyl (meth)acrylate and N,N-diethylaminoethyl (meth)acrylate; (meth)acrylamide having a tertiary amino group such as N,N-dimethylaminopropyl (meth)acrylamide and N,N-diethylaminopropyl (meth)acrylamide, or the like. The quaternized salts of these monomers mean those obtained by reacting the unsaturated monomer having a secondary amino group or the unsaturated monomer having a tertiary amino group with a quaternizing agent. The quaternized salts may be inorganic acid salts such as hydrochloride and sulfate, or organic acid salts such as acetate. Moreover, the quaternizing agent is methyl chloride, benzyl chloride, dimethyl sulfate, epichlorohydrin, or the like. They may be used in combination. Among them, the (a2) component is preferably an unsaturated monomer having a tertiary amino group or a quaternized salt thereof, more preferably comprises (meth)acrylate having a tertiary amino group or a quaternized salt of the (meth)acrylate, from the viewpoint of a high copolymerizability with the (a1) component, further preferably N,N-dimethylaminoethyl (meth)acrylate or a quaternized salt of N,N-dimethylaminoethyl (meth)acrylate, further preferably N,N-dimethylaminoethyl acrylate, N,N-dimethylaminoethyl acrylate benzyl chloride, or N,N-dimethylaminoethyl methacrylate benzyl chloride, from the viewpoint that a polymer having a higher weight-average molecular weight can be obtained.

The (a3) component is not particularly limited as long as it has anionic properties. By way of an example, the (a3) component is an unsaturated monomer having a carboxyl group such as (meth)acrylic acid, itaconic acid, itaconic anhydride, fumaric acid, and maleic acid; an unsaturated monomer having a sulfonic group such as vinyl sulfonic acid and methallyl sulfonic acid, or the like. Besides, these acids may be alkali metal salts such as sodium and potassium, or salts such as an ammonium salt. The (a3) component may be used in combination.

The (a4) component is a component for introducing a branched structure into a polymer. The (a4) component is not particularly limited. By way of an example, the (a4) component is N-alkyl (meth)acrylamide such as N-methyl (meth)acrylamide, N-ethyl (meth)acrylamide, N-isopropyl (meth)acrylamide, and N-t-butyl (meth)acrylamide; N,N-dialkyl (meth)acrylamide such as N,N-dimethyl (meth)acrylamide, N,N-diethyl (meth)acrylamide, and N,N-diisopropyl (meth)acrylamide; N,N'-alkylene bis (meth)acrylamide such as N,N'-methylene bis (meth)acrylamide and N,N'-ethylene bis (meth)acrylamide; a triallyl group-containing crosslinkable unsaturated monomer such as triallyl isocyanurate, triallyl trimellitate, triallylamine, and triallyl (meth)acrylamide; a (meth)acryloyl group-containing triazine such as 1,3,5-triacryloyl-1,3,5-triazine and 1,3,5-triacryloylhexahydro-1,3,5-triazine, or the like. The (a4) component may be used in combination. Among them, the (a4) component is preferably at least one selected from the group consisting of N,N'-dialkyl (meth)acrylamide, N,N'-alkylene bis (meth) acrylamide, and (meth)acryloyl group-containing triazine, more preferably N,N-dimethylacrylamide or N,N'-methylene bisacrylamide, from the viewpoint that a weight-average molecular weight of a polymer can be increased.

An amount of each constituent monomer of the polymer (A1) used is not particularly limited. From the viewpoint that the obtained paper exhibits an excellent paper-strengthening effect, the amount of each constituent monomer of the polymer (A1) used is appropriately as follows in terms of molar ratio.

(a1) component: preferably 63 to 96.5 mol %, more preferably 77 to 93.5 mol %
(a2) component: preferably 1 to 15 mol %, more preferably 3 to 10 mol %
(a3) component: preferably 2 to 20 mol %, more preferably 3 to 12 mol %
(a4) component: preferably 0.002 to 2 mol %, more preferably 0.004 to 0.2 mol %

Moreover, an amount of each constituent monomer of the polymer (A2) used is not particularly limited. From the viewpoint that the obtained paper exhibits an excellent paper-strengthening effect, the amount of each constituent monomer of the polymer (A2) used is appropriately as follows in terms of molar ratio.

(a1) component: preferably 63 to 96.5 mol %, more preferably 77 to 93.5 mol %
(a2) component: preferably 2 to 20 mol %, more preferably 3 to 12 mol %
(a3) component: preferably 1 to 15 mol %, more preferably 3 to 10 mol %
(a4) component: preferably 0.002 to 2 mol %, more preferably 0.004 to 0.2 mol %

The above-described constituent monomer may further comprise a monomer (a5) (hereinafter, referred to as an (a5) component) other than the (a1) to (a4) components.

The (a5) component is not particularly limited. By way of an example, the (a5) component include an aromatic unsaturated monomer such as styrene, α-methylstyrene, and vinyltoluene; alkyl (meth)acrylate such as methyl (meth)acrylate, ethyl (meth)acrylate, n-propyl (meth)acrylate, n-butyl (meth)acrylate, 2-ethylhexyl (meth)acrylate, and cyclohexyl (meth)acrylate; vinyl carboxylate such as vinyl acetate and vinyl propionate; nitrile such as acrylonitrile; mercaptans such as 2-mercaptoethanol and n-dodecyl mercaptan; alcohol such as ethanol, isopropyl alcohol, and n-pentyl alcohol; an aromatic compound such as α-methylstyrene dimer, ethylbenzene, isopropylbenzene, and cumene; carbon tetrachloride, and the like. The (a5) component may be used in combination. A content of (a5) the component when compounded is preferably less than 5 mol % in all constituent monomers.

In production of a polymer, organic acids such as citric acid, succinic acid, and oxalic acid; inorganic acid such as hydrochloric acid, sulfuric acid, and phosphoric acid; inorganic bases such as sodium hydroxide, potassium hydroxide, and calcium hydroxide; additives such as an antifoaming agent and an antioxidant may be added. The additives may be used in combination. A content of the additive when compounded is preferably 5 parts by mass or less based on 100 parts by mass of all the constituent monomers.

A polymerization method of the polymer (A1) and the polymer (A2) is not particularly limited. By way of an example, the polymerization method is a method of polymerizing monomer components including an (a1) component, an (a2) component, an (a3) component, and an (a4) component, and if necessary, an (a5) component and the above-described additives in a solvent.

The polymerization method is a method using only a dropping polymerization method, a combined method of a simultaneous polymerization method (in which monomer mixed solutions are charged in a batch) and the dropping polymerization method, or the like.

The dropping polymerization method is a method of dropping a monomer mixed solution into a reaction system in which a solvent such as water is charged in advance. Examples of the method using only the dropping polymerization method include the followings (1) to (3). Besides, the dropping may be continuously performed, or the dropping may be stopped in the middle to perform polymerization for a certain period of time, and then the dropping may be restarted.

(1) A method of dropping a monomer mixed solution, in which all monomer components are mixed, in a reaction system
(2) A method of separately preparing two or more kinds of monomer mixed solutions and then dropping them in a reaction system at the same time
(3) A method of separately preparing two or more kinds of monomer mixed solutions and then dropping them in a reaction system in turn Moreover, examples of the combined method of the simultaneous polymerization method and the dropping polymerization method include, for example, the followings (4) to (7).

(4) A method of separately co-polymerizing each monomer mixed solution and then mixing each polymer
(5) A method of co-polymerizing one or more kinds of monomer mixed solutions and then dropping the remaining monomer mixed solutions
(6) A method of co-polymerizing one or more kinds of monomer mixed solutions, in the middle of which the remaining monomer mixed solutions are dropped and polymerized
(7) A method of dropping and polymerizing one or more kinds of monomer mixed solutions, adding the remaining monomer mixed solutions all at once, and then co-polymerizing them Among them, as the polymerization method, the methods (3) to (7) are preferable in order to localize an ion of the obtained polymer and enhance an electrical interaction.

Here, when preparing two or more kinds of monomer mixed solutions, it is more preferable to perform such operations that concentrations of the (a2) component and the (a3) component involved in reaction are increased in any of the monomer mixed solutions, such as increasing amounts of the (a2) component and the (a3) component in some mixed solutions to subject these mixed solutions to reaction in sequence, or adding the (a2) component and the (a3) component at a certain point during the polymerization reaction.

Examples of the solvent include water, an organic solvent, and the like. The solvent may be used in combination. The organic solvent is not particularly limited. By way of an example, the organic solvent is alcohol such as methanol, ethanol, n-propyl alcohol, isopropyl alcohol, n-butyl alcohol, sec-butyl alcohol, t-butyl alcohol, isobutyl alcohol, n-hexyl alcohol, n-octyl alcohol, ethylene glycol, propylene glycol, diethylene glycol, triethylene glycol, and diacetone alcohol; ether such as ethylene glycol monobutyl ether, propylene glycol monomethyl ether, and propylene glycol monoethyl ether, or the like. Among them, water is preferably used as the solvent from the viewpoint of dissolving the (a1) to (a6) components.

The polymerization initiator is not particularly limited. By way of an example, the polymerization initiator is persulfate such as ammonium persulfate, potassium persulfate, and sodium persulfate; an azo-based compound such as 2,2'-azobis(2-amidinopropane) hydrochloride and 2,2'-azobis[2 (2-imidazoline-2-yl) propane] hydrochloride; hydrogen peroxide, or the like. The polymerization initiator may be used in combination. Among them, the polymerization initiator is preferably ammonium persulfate, potassium persulfate, or 2,2'-azobis(2-amidinopropane) hydrochloride, from the viewpoint of sufficiently advancing solution polymerization. Moreover, a method of adding the polymerization initiator is not particularly limited. By way of an example, the method of adding the polymerization initiator can be appropriately selected from batch addition, partial addition, continuous dropping, and the like. Moreover, a content of the polymerization initiator is not particularly limited. By way of an example, the content of the polymerization initiator is preferably 0.001 to 5 parts by mass, more preferably 0.01 to 1 part by mass, based on 100 parts by mass of the (a1) to (a5) components.

A polymerization condition is not particularly limited. By way of an example, the polymerization condition is of a temperature at about 50 to 100° C. and a time of about 1 to 8 hours.

To the solution of the polymer (A1) and the polymer (A2), organic acids such as citric acid, succinic acid, and oxalic acid; inorganic acids such as hydrochloric acid, sulfuric acid, and phosphoric acid; inorganic bases such as sodium hydroxide, potassium hydroxide, and calcium hydroxide; a water-soluble aluminum compound, a Glauber's salt (sodium sulfate), urea, polysaccharides (for example, starch), an anti-foaming agent, an antioxidant, a polymerization inhibitor, a preservative, and the like may be further added.

<Condition (2)>

The condition (2) defines weight-average molecular weights of the polymer (A1) and the polymer (A2).

The above-described weight-average molecular weights (referred to as values obtained by a gel permeation chromatography (GPC) method) are both 1,500,000 to 10,000,000. When the weight-average molecular weight is less than 1,500,000, the obtained paper-strengthening agent does not sufficiently exhibit a paper-strengthening effect. On the other hand, when the weight-average molecular weight exceeds 10,000,000, the obtained paper-strengthening agent becomes difficult to exhibit a paper-strengthening effect due to deterioration of the formation of paper or the like. From the similar point of view, for the obtained paper-strengthening agent, the weight-average molecular weight is preferably 2,500,000 to 10,000,000, more preferably 4,000,000 to 10,000,000.

<Condition (3)>

The condition (3) defines a specific relational expression for each viscosity of the paper-strengthening agent (A), the polymer (A1), and the polymer (A2).

The viscosity here refers to a value measured with a B-type viscometer with adjustment to a temperature at 25° C. in advance using an aqueous solution having a solid content concentration of 15% by mass and a pH of 4.

When adjusting the solid content concentration, it is preferable to use water such as, for example, a deionized water. Moreover, when adjusting the pH, various known pH adjusters can be used. The pH adjuster is not particularly limited. By way of an example, the pH adjuster is an inorganic acid such as hydrochloric acid, sulfuric acid, and phosphoric acid; an inorganic base such as sodium hydroxide, potassium hydroxide, and calcium hydroxide, or the like.

In the present embodiment, a viscosity of the paper-strengthening agent (A), a viscosity of the polymer (A1), and a viscosity of the polymer (A2) satisfy the relationship of (Inequality 1).

$$1.1 \leq X_A/(m_{A1} \times X_{A1} + m_{A2} \times X_{A2}) \leq 6 \quad \text{(Inequality 1)}$$

(wherein, $m_{A1}$ is a ratio of a solid content weight of the polymer (A1) to a total weight of the polymer (A1) and the polymer (A2), $m_{A2}$ is a ratio of a solid content weight of the polymer (A2) to the total weight of the polymer (A1) and the polymer (A2), and $m_{A1}+m_{A2}=1$.)

In (Inequality 1), $X_A$ represents a viscosity (25° C.) of an aqueous solution (pH: 4) of the paper-strengthening agent (A) with 15% by mass of concentration, $X_{A1}$ represents a viscosity (25° C.) of an aqueous solution (pH: 4) of the polymer (A1) with 15% by mass of concentration, and $X_{A2}$ represents a viscosity (25° C.) of an aqueous solution (pH: 4) of the polymer (A2) with 15% by mass of concentration, respectively.

In the above-described relational expression for viscosity, the viscosity of the paper-strengthening agent (A) is higher than an arithmetic mean value of the viscosity of the polymer (A1) and the viscosity of the polymer (A2).

Here, the "arithmetic mean value" is a value calculated from a solid content weight ratio of the polymer (A1) to the polymer (A2) and the respective viscosity.

For example, when 75 parts by mass of the polymer (A1) (viscosity: 1,000 mPa·s) and 25 parts by mass of the polymer (A2) (viscosity: 1,500 mPa·s) are mixed, the arithmetic mean value is as follows.

$$\text{(Arithmetic mean value)} = M_{A1} \times XA1 + m_{A2} \times X_{A2} = \{75/(75+25)\} \times 1,000 + \{25/(75+25)\} \times 1,500 = 750 + 375 = 1,125 \text{(mPa·s)}$$

The reason why the viscosity of the paper-strengthening agent (A) is higher than the arithmetic mean value is that, when the polymer (A1) and the polymer (A2) are mixed, the cation component and the anion component contained in each polymer electrically interacts with each other to form a PIC in the system. Moreover, the more PICs are formed, the higher the viscosity of the paper-strengthening agent (A) becomes. As a result, the paper obtained by using the paper-strengthening agent (A) exhibits an excellent paper-strengthening effect as compared with the case where only the polymer (A1) or the polymer (A2) is used. Moreover, when the viscosity of the paper-strengthening agent (A) satisfies the above-described relationship, paper obtained by papermaking not only in a papermaking environment where the electric conductivity is low but also in a papermaking environment where the electric conductivity is high (PIC is difficult to be formed) becomes easy to exhibit an excellent paper-strengthening effect. Besides, when PIC is excessively formed, the paper-strengthening agent (A) becomes highly viscous. As a result, over-aggregation is caused in the pulp slurry when papermaking, and the obtained paper becomes less likely to exhibit a paper-strengthening effect.

In (Inequality 1) of the present embodiment, when a value is less than 1.1, a paper-strengthening effect is not sufficiently exhibited. On the other hand, when the value exceeds 6, formation of paper is disturbed due to over-aggregation, and the paper-strengthening effect becomes easy to be insufficient. Moreover, in order to obtain a sufficient paper-strengthening effect, $X_A/(m_{A1} \times X_{A1} + m_{A2} \times X_{A2})$ is preferably 1.5 or more, more preferably 2 or more. In addition, $X_A/(m_{A1} \times X_{A1} + m_{A2} \times X_{A2})$ is preferably 5 or less, more preferably 4 or less.

The viscosity ($X_A$) is preferably about 1,100 to 40,000 mPa·s, more preferably about 3,000 to 20,000 mPa·s, further preferably about 5,000 to 12,000 mPa·s, from the viewpoints that a paper-strengthening agent is well dispersed in the pulp slurry and the obtained paper also exhibits an excellent paper-strengthening effect.

The viscosity ($X_{A1}$) is preferably about 1,000 to 12,000 mPa·s, more preferably about 2,000 to 12,000 mPa·s, further preferably about 3,000 to 10,000 mPa·s.

The viscosity ($X_{A2}$) is preferably about 1,000 to 12,000 mPa·s, more preferably about 2,000 to 12,000 mPa·s, further preferably about 3,000 to 10,000 mPa·s.

When the paper-strengthening agent (A) of the present embodiment satisfies the above-described relationship of (Inequality 1), the paper obtained by papermaking not only in a papermaking environment where the electric conductivity is low but also in a papermaking environment where the electric conductivity is high (PIC is difficult to be formed) exhibits an excellent paper-strengthening effect. In order to obtain such paper-strengthening agent, it is preferable to mix the following polymer (A1) and polymer (A2).

First, in the polymer (A1), a liquid containing a small amount of an (a1) component and a large amount of an (a2) component (hereinafter referred to as a liquid (1-1)) is polymerized to form a polymer chain in which cationic properties derived from the (a2) component are densely packed. On the other hand, a liquid containing larger amounts of an (a1) component and an (a3) component than those of the (a1) and (a3) components contained in the liquid (1-1) (hereinafter referred to as a liquid (1-2)) is polymerized to form a polymer chain in which anionic properties derived from the (a3) component are scattered. Besides, when preparing three or more kinds of liquids, the compounding method is not particularly limited as long as the above-described two kinds of liquid (1-1) and liquid (1-2) are contained. Then, by subjecting these polymers to cross-linking reactions, the polymer (A1) is formed into a structure in which skeletons derived from the (a3) component exhibiting anionicity (for example, acrylic acid, itaconic acid) are widely scattered and skeletons derived from the (a2) component exhibiting cationicity (for example, N,N-dimethyl-aminoethyl (meth)acrylate) are localized.

In the polymer (A2), a liquid containing a small amount of an (a1) component and a large amount of an (a3) component (hereinafter referred to as a liquid (2-1)) is polymerized to form a polymer chain in which anionic properties derived from the (a3) component are densely packed. On the other hand, a liquid containing larger amounts of an (a1) component and an (a2) component than those of the (a1) and (a2) components contained in the liquid (2-1) (hereinafter referred to as a liquid (2-2)) is polymerized to form a polymer chain in which cationic properties derived from the (a2) component are scattered. Besides, when preparing three or more kinds of liquids, the compounding method is not particularly limited as long as the above-described two kinds of liquid (2-1) and liquid (2-2) are contained. By subjecting these polymers to cross-linking reactions, the polymer (A2) is formed into a structure in which skeletons derived from the (a2) component exhibiting cationicity are widely scattered and skeletons derived from the (a3) component exhibiting anionicity are localized.

When these polymers are mixed, the scattered ions of the polymer (A1) and the polymer (A2) electronically interact with each other to form a PIC. As a result, the viscosity of the paper-strengthening agent (A) becomes a value equal to or greater than an arithmetic mean of viscosity of the polymer (A1) and the polymer (A2), respectively.

Besides, a degree of localization of an ionic group in each of the above-described preferable polymers (A1) and polymer (A2) can be indicated by a signal area ratio of a high magnetic field side signal H to a low magnetic field side signal L detected at 0.9 to 1.35 ppm in $^1$H-NMR spectrum [Hs/(Hs+Ls)] (Hs represents an area of the signal H and Ls represents an area of the signal L). The details and the measuring method are described in JP 2014-196588 A.

In the paper-strengthening agent of the present embodiment, the area ratio of the area of the signal H [Hs (A1)] to the area of the signal L [Ls (A1)] of the above-described preferable polymer (A1) [Hs (A1)/{Hs (A1)+Ls (A1)}] is preferably 20% or more, more preferably 25 to 40%, further preferably 25 to 35%.

Moreover, in addition to the above, the area ratio of the area of the signal H [Hs (A2)] to the area of the signal L [Ls (A2)] of the above-described preferable polymer (A2) [Hs (A2)/{Hs (A2)+Ls (A2)}] is preferably less than 20%, more preferably 5 to 18%, further preferably 10 to 15%.

The paper of the present embodiment is obtained by using the above-described paper-strengthening agent. Examples of a method of producing paper include, for example, adding a paper-strengthening agent solution into a raw material pulp slurry, coating it on a surface of a base paper, or the like.

As a paper-strengthening agent for producing paper, it is preferable to use one diluted with water or the like (hereinafter referred to as a "dilute solution"). A solid content concentration of the dilute solution is not particularly limited. By way of an example, the concentration of the dilute solution is usually 0.01 to 2% by mass.

When a dilute solution is added into the raw material pulp slurry, the dilute solution is added to the pulp slurry for papermaking. In that case, a viscosity is about 1 to 100 mPa·s at a temperature of 25° C. An amount of the dilute solution used (in terms of a solid content) is not particularly limited. By way of an example, the amount of the dilute solution used is about 0.01 to 4% by mass based on a dry weight of a pulp. Moreover, a type of the pulp is not particularly limited. By way of an example, the type of the pulp is of a chemical pulp such as Leaf Bleached Kraft Pulp (LBKP) and Needle Bleached Kraft Pulp (NBKP); a mechanical pulp such as Ground Pulp (GP), Refiner Ground Pulp (RGP), and Thermomechanical Pulp (TMP); a recycled pulp such as a waste corrugated fiberboard, or the like. Besides, when the paper-strengthening agent solution is added into the raw material pulp slurry, additionally, as retention aids, pH adjusters such as aluminum sulfate, sulfuric acid, and sodium hydroxide; paper-making chemicals such as a sizing agent and a wet paper-strengthening agent; and fillers such as talc, clay, kaolin, titanium dioxide, and calcium carbonate can be added.

When the dilute solution of the paper-strengthening agent solution is coated on the surface of the base paper, the paper-strengthening agent solution is coated on the surface of the base paper by various known means. In that case, a viscosity of the paper-strengthening agent solution is usually 1 to 40 mPa·s at a temperature of 50° C. Uncoated paper made from wood cellulose fibers can be used as a type of the base paper. A coating means is not particularly limited. By way of an example, the coating means is by way of a bar coater, a knife coater, an air knife coater, a calender, a gate roll coater, a blade coater, a two-roll size press, a rod metering, or the like. Moreover, a coating amount of the paper-strengthening agent solution (in terms of a solid content) is not particularly limited. By way of an example, the coating amount of the paper-strengthening agent solution (in terms of the solid content) is usually preferably about 0.001 to 2 g/m², more preferably about 0.005 to 1 g/m².

The paper of the present embodiment is appropriate as various products. By way of an example, the paper is appropriate as a coated base paper, newspaper, linerboard, corrugated medium, paper tube, printing and writing paper, form paper, PPC paper, cup base paper, inkjet paper, heat-sensitive paper, or the like.

The method of producing paper of the present embodiment includes a step of adding the above-described paper-strengthening agent to the pulp slurry for papermaking. The similar conditions as those for a common method of producing paper can be adopted except that the above-described paper-strengthening agent is added to the pulp slurry. According to the method of producing paper of the present embodiment, paper exhibiting a good formation and a high paper-strengthening effect can be obtained.

The pulp slurry preferably has an electrical conductivity of 3 mS/cm or more. With such a pulp slurry used, the producing method of the present embodiment does not cause excessive aggregation while exhibiting high freeness and yield, and a good formation is obtained, allowing for improvement in paper-strengthening effect of the obtained paper.

One embodiment of the present invention has been described above. The present invention is not particularly limited to the above-described embodiment. Besides, the above-described embodiment mainly describes an invention having the following configurations.

(1) A paper-strengthening agent comprising an amphoteric (meth)acrylamide polymer (A1) and an amphoteric (meth)acrylamide polymer (A2),
  wherein each of constituent monomers of the amphoteric (meth)acrylamide polymer (A1) and the amphoteric (meth)acrylamide polymer (A2) comprises (meth)acrylamide (a1), a cationic unsaturated monomer (a2), an anionic unsaturated monomer (a3), and a crosslinkable unsaturated monomer (a4),
  wherein each of weight-average molecular weights of the amphoteric (meth)acrylamide polymer (A1) and the amphoteric (meth)acrylamide polymer (A2) is 1,500,000 to 10,000,000, and
  wherein, where a viscosity (25° C.) of an aqueous solution (pH: 4) of 15% by mass of paper-strengthening agent is defined as $X_A$ mPa·s, a viscosity (25° C.) of an aqueous solution (pH: 4) of the amphoteric (meth)acrylamide polymer (A1) with 15% by mass of concentration is defined as $X_{A1}$ mPa·s, and a viscosity (25° C.) of an aqueous solution (pH: 4) of the amphoteric (meth)acrylamide polymer (A2) with 15% by mass of concentration is defined as $X_{A2}$ mPa·s, the paper-strengthening agent satisfies the following inequality 1:

$1.1 \leq X_A/(m_{A1} \times X_{A1} + m_{A2} \times X_{A2}) \leq 6$    (Inequality 1)

(wherein, $m_{A1}$ is a ratio of a solid content weight of the amphoteric (meth)acrylamide polymer (A1) to a total weight of the amphoteric (meth)acrylamide polymer (A1) and the amphoteric (meth)acrylamide polymer (A2), $m_{A2}$ is a ratio of a solid content weight of the amphoteric (meth)acrylamide polymer (A2) to the total weight of the amphoteric (meth)acrylamide polymer (A1) and the amphoteric (meth)acrylamide polymer (A2), and $m_{A1} + m_{A2} = 1$.)

(2) The paper-strengthening agent of (1), wherein the viscosity $X_A$ is 1,100 to 40,000 mPa·s.

(3) The paper-strengthening agent of (1) or (2), wherein the viscosity $X_{A1}$ is 1,000 to 12,000 mPa·s.

(4) The paper-strengthening agent of any one of (1) to (3), wherein the viscosity $X_{A2}$ is 1,000 to 12,000 mPa·s.

(5) Paper obtained by using a paper-strengthening agent of any one of (1) to (4).

(6) A method of producing paper, the method comprising adding a paper-strengthening agent of any one of (1) to (4) to a pulp slurry.

(7) The method of producing paper of (6), wherein the pulp slurry has an electrical conductivity of 3 mS/cm or more.

EXAMPLE

Hereinafter, the present invention will be described with reference to Examples. The present invention is not limited these Examples. Besides, unless otherwise specified, "part(s)" and "%" in Examples and Comparative examples are based on weight.

Abbreviations of compounds are shown below.
AM: Acrylamide
DM: N,N-dimethylaminoethyl methacrylate
DML: N,N-dimethylaminoethyl methacrylate benzyl chloride
BQ: N,N-dimethylaminoethyl acrylate benzyl chloride
APDM: N,N-dimethylaminopropyl acrylamide
IA: Itaconic acid
AA: Acrylic acid
SMAS: Sodium methallylsulfonate
DMAA: N,N-dimethylacrylamide
MBAA: N,N'-methylenebisacrylamide
APS: Ammonium persulfate <Weight-Average Molecular Weights of Polymer (A1) and Polymer (A2)>

A weight-average molecular weight of the paper-strengthening agent was measured by gel permeation chromatography (GPC) method under the following measurement conditions.

Column: One Guard column PWXL and two GMPWXL manufactured by Tosoh Corporation
Eluent: Phosphate buffer (0.05 mol/L phosphoric acid (manufactured by FUJIFILM Wako Pure Chemical Corporation)+0.13 mol/L sodium dihydrogen phosphate (manufactured by FUJIFILM Wako Pure Chemical Corporation) aqueous solution, pH:about 2.5)
Flow rate: 0.8 mL/min
Temperature: 40° C.
RI detector: Shodex RI-101 manufactured by Showa Denko K.K.
MALS detector: DAWN HELEOS-II manufactured by Wyatt Technology
Measurement sample: Measured by diluting with the above-described eluent so that a concentration of a polymer became 0.1%.

<Viscosity of Polymer (A1) and Polymer (A2) Immediately after Synthesis>

A viscosity of a sample at a temperature of 25° C. was measured using a B-type viscometer (manufactured by Toki Sangyo Co., Ltd.). Besides, the viscosity here represents a viscosity obtained immediately after synthesis.

<pH>

A pH of a sample at a temperature of 25° C. was measured using a commercially available measuring machine (product name: "pH METER F-14", manufactured by HORIBA, Ltd.).

Production Example 1-1

69.1 parts of ion-exchanged water were put into a reactor equipped with a stirrer, a thermometer, a reflux cooling tube, a nitrogen gas introduction tube, and three dropping funnels, removed of oxygen in a reaction system through nitrogen gas, and then heated to 90° C. 43.6 parts (23.96 mol %) of 50% AM, 10.0 parts (5.0 mol %) of DM, 0.8 parts (0.50 mol %) of IA, 0.6 parts (0.30 mol %) of SMAS, 4.8 parts of 62.5% sulfuric acid, 0.06 parts (0.05 mol %) of DMAA, and 35.3 parts of ion-exchanged water were charged into the dropping funnel (1), and pH was adjusted to around 3.0 with sulfuric acid (a monomer mixed solution (I)). Moreover, 121.7 parts (66.93 mol %) of AM, 2.0 parts (1.0 mol %) of DM, 3.3 parts (2.0 mol %) of IA, 0.4 parts (0.20 mol %) of SMAS, 1.0 part of 62.5% sulfuric acid, 0.06 parts (0.05 mol %) of DMAA, 0.02 parts (0.01 mol %) of MBAA, and 62.0 parts of ion-exchanged water were charged into the dropping funnel (2), and pH was adjusted to around 3.0 with sulfuric acid (a monomer mixed solution (II)). 0.14 parts of APS and 45.0 parts of ion-exchanged water were charged into the dropping funnel (3). Next, a catalyst in a system was dropped with the dropping funnel (3) over about 3 hours. In parallel, the monomer mixed solution (I) in the dropping funnel (1) and the monomer mixed solution (II) in the dropping funnel (2) were dropped in this order at a constant flow rate over about 3 hours. After completion of the dropping, 0.1 parts of APS and 2.0 parts of ion-exchanged water were charged and kept warm for 1 hour, and 112 parts of ion-exchanged water were charged to obtain an aqueous solution of a polymer (A1-1) having a pH of 4. The physical properties are shown in Table 2 (the same applies hereinafter).

Production Examples 1-2 to 1-3, Production Examples 1-6 to 1-11, Production Examples 2-1 to 2-3, Production Examples 2-6 to 2-10, Comparative Production Examples 1 to 5

Aqueous solutions of polymers each having a pH of 4 were obtained in the similar manner of synthesis as in Production example 1-1 with compositions shown in Table 1.

Production Example 1-4

An aqueous solution of a polymer (A1-4) having a pH of 4 was obtained in the similar manner as in Production example 1-2 except that, after completion of dropping, 0.28 parts of APS and 2.0 parts of ion-exchanged water were charged and kept warm for 3 hours.

Production Example 1-5

An aqueous solution of a polymer (A1-5) having a pH of 4 was obtained in the similar manner as in Production example 1-1 except that, after completion of dropping, 0.14 parts of APS and 2.0 parts of ion-exchanged water were charged and kept warm for 0.5 hours.

Production Example 2-4

An aqueous solution of a polymer (A2-4) having a pH of 4 was obtained in the similar manner as in Production example 2-2 except that, after completion of dropping, 0.28 parts of APS and 2.0 parts of ion-exchanged water were charged and kept warm for 3 hours.

Production Example 2-5

An aqueous solution of a polymer (A2-5) having a pH of 4 was obtained in the similar manner as in Production example 2-1 except that, after completion of dropping, 0.14 parts of APS and 2.0 parts of ion-exchanged water were charged and kept warm for 0.5 hours.

Production Example 1-12

69.1 parts of ion-exchanged water were put into a reactor similar with that in Production example 1-1, removed of oxygen in a reaction system through nitrogen gas, and then heated to 90° C. 43.6 parts (23.96 mol %) of AM, 10.0 parts (5.0 mol %) of DM, 0.8 parts (0.50 mol %) of IA, 0.6 parts (0.30 mol %) of SMAS, 4.8 parts of 62.5% sulfuric acid, 0.06 parts (0.05 mol %) of DMAA, and 35.3 parts of ion-exchanged water were charged into the dropping funnel (1), and pH was adjusted to around 3.0 with sulfuric acid (a monomer mixed solution (I)). Moreover, 60.8 parts (33.61 mol %) of AM, 1.0 part (0.50 mol %) of DM, 1.7 parts (1.0 mol %) of IA, 0.2 parts (0.10 mol %) of SMAS, 0.5 parts of 62.5% sulfuric acid, 0.04 parts (0.03 mol %) of DMAA, and 31.0 parts of ion-exchanged water were charged into the dropping funnel (2), and pH was adjusted to around 3.0 with sulfuric acid (a monomer mixed solution (II)). Furthermore, 60.8 parts (33.33 mol %) of AM, 1.0 part (0.50 mol %) of DM, 1.7 parts (1.0 mol %) of IA, 0.2 parts (0.10 mol %) of SMAS, 0.5 parts of 62.5% sulfuric acid, 0.03 parts (0.02 mol %) of DMAA, 0.02 parts (0.01 mol %) of MBAA, and 31.0 parts of ion-exchanged water were charged into the dropping funnel (3), and pH was adjusted to around 3.0 with sulfuric acid (a monomer mixed solution (III)). 0.14 parts of APS and 45 parts of ion-exchanged water were charged into the dropping funnel (4). Next, a catalyst in a system was dropped with the dropping funnel (4) over about 3 hours. In parallel, the monomer mixed solutions (I), (II), and (III) in the dropping funnels (1), (2), and (3) were dropped in this order at a constant flow rate over about 3 hours. After completion of the dropping, 0.1 parts of APS and 2.0 parts of ion-exchanged water were charged and kept warm for 1 hour, and 112 parts of ion-exchanged water were charged to obtain an aqueous solution of a polymer (A1-12) having a pH of 4.

Production Example 2-11

An aqueous solution of a polymer (A2-11) having a pH of 4 was obtained in the similar manner of synthesis as in Production example 1-12 with compositions shown in Table 1.

<Viscosity of Polymer (A1) and Polymer (A2) at Concentration of 15% and pH of 4>

The obtained polymers (A-1) to (A1-12), polymer (A2-1) to (A2-11), and polymer (B-1) to (B-5) were diluted by adding a deionized water so as to have a concentration of 15%. Moreover, after adjusting pH to 4 with a 5% sulfuric acid aqueous solution, a viscosity at a temperature of 25° C. was measured using a B-type viscometer (manufactured by Toki Sangyo Co., Ltd.). The results are shown in Table 3.

TABLE 1

| | | Monomer composition (mol %) | | | | | | | | | |
|---|---|---|---|---|---|---|---|---|---|---|---|
| | | | (a2) component | | | | (a3) component | | | (a4) component | |
| | Component No. | AM | DM | DML | BQ | APDM | IA | AA | SMAS | DMAA | MBAA |
| Production example 1-1 | A1-1 | 90.89 | 6.0 | — | — | — | 2.5 | — | 0.50 | 0.10 | 0.01 |
| Production example 1-2 | A1-2 | 91.09 | 6.0 | — | — | — | 2.5 | — | 0.30 | 0.10 | 0.01 |
| Production example 1-3 | A1-3 | 90.35 | 6.0 | — | — | — | 2.5 | — | 1.0 | 0.10 | 0.05 |
| Production example 1-4 | A1-4 | 91.09 | 6.0 | — | — | — | 2.5 | — | 0.30 | 0.10 | 0.01 |
| Production example 1-5 | A1-5 | 90.89 | 6.0 | — | — | — | 2.5 | — | 0.50 | 0.10 | 0.01 |
| Production example 1-6 | A1-6 | 78.89 | 18.0 | — | — | — | 2.5 | — | 0.50 | 0.10 | 0.01 |
| Production example 1-7 | A1-7 | 90.89 | 4.0 | 1.0 | 1.0 | — | 2.5 | — | 0.50 | 0.10 | 0.01 |
| Production example 1-8 | A1-8 | 90.89 | 3.0 | 1.0 | 1.0 | 1.0 | 2.5 | — | 0.50 | 0.10 | 0.01 |
| Production example 1-9 | A1-9 | 81.39 | 6.0 | — | — | — | 12.0 | — | 0.50 | 0.10 | 0.01 |
| Production example 1-10 | A1-10 | 71.39 | 6.0 | — | — | — | 22.0 | — | 0.50 | 0.10 | 0.01 |
| Production example 1-11 | A1-11 | 90.89 | 6.0 | — | — | — | 2.5 | — | 0.50 | 0.10 | 0.01 |
| Production example 1-12 | A1-12 | 90.89 | 6.0 | — | — | — | 2.5 | — | 0.50 | 0.10 | 0.01 |
| Production example 2-1 | A2-1 | 90.89 | 6.0 | — | — | — | 2.5 | — | 0.50 | 0.10 | 0.01 |
| Production example 2-2 | A2-2 | 91.09 | 6.0 | — | — | — | 2.5 | — | 0.30 | 0.10 | 0.01 |
| Production example 2-3 | A2-3 | 90.35 | 6.0 | — | — | — | 2.5 | — | 1.0 | 0.10 | 0.05 |
| Production example 2-4 | A2-4 | 91.09 | 6.0 | — | — | — | 2.5 | — | 0.30 | 0.10 | 0.01 |
| Production example 2-5 | A2-5 | 90.89 | 6.0 | — | — | — | 2.5 | — | 0.50 | 0.10 | 0.01 |
| Production example 2-6 | A2-6 | 84.89 | 12.0 | — | — | — | 2.5 | — | 0.50 | 0.10 | 0.01 |
| Production example 2-7 | A2-7 | 90.89 | 4.0 | 1.0 | 1.0 | — | 2.5 | — | 0.50 | 0.10 | 0.01 |
| Production example 2-8 | A2-8 | 90.89 | 3.0 | 1.0 | 1.0 | 1.0 | 2.5 | — | 0.50 | 0.10 | 0.01 |
| Production example 2-9 | A2-9 | 90.89 | 6.0 | — | — | — | — | 2.5 | 0.50 | 0.10 | 0.01 |
| Production example 2-10 | A2-10 | 75.39 | 6.0 | — | — | — | 18.0 | — | 0.50 | 0.10 | 0.01 |
| Production example 2-11 | A2-11 | 90.89 | 6.0 | — | — | — | 2.5 | — | 0.50 | 0.10 | 0.01 |
| Comparative production example 1 | B-1 | 93.39 | 6.0 | — | — | — | — | — | 0.50 | 0.10 | 0.01 |
| Comparative production example 2 | B-2 | 94.39 | — | — | — | — | 5.0 | — | 0.50 | 0.10 | 0.01 |
| Comparative production example 3 | B-3 | 89.65 | 6.0 | — | — | — | 2.5 | — | 1.5 | 0.10 | 0.25 |
| Comparative production example 4 | B-4 | 91.0 | 6.0 | — | — | — | 2.5 | — | 0.50 | — | — |
| Comparative production example 5 | B-5 | 91.4 | 6.0 | — | — | — | 2.5 | — | — | 0.10 | — |

TABLE 2

| | | Monomer composition (mol %) Monomer mixed solution (I) | | | | | | | | | | | |
|---|---|---|---|---|---|---|---|---|---|---|---|---|---|
| | | | (a2) | | | | | (a3) | | | (a4) | | |
| | Symbol | AM | DM | DML | BQ | APDM | Total | IA | AA | SMAS | DMAA | MBAA | Total |
| Production example 1-1 | A1-1 | 23.96 | 5.0 | — | — | — | 5.0 | 0.5 | — | 0.30 | 0.05 | — | 0.05 |
| Production example 1-2 | A1-2 | 24.32 | 5.0 | — | — | — | 5.0 | 0.5 | — | 0.10 | 0.05 | — | 0.05 |
| Production example 1-3 | A1-3 | 22.83 | 5.0 | — | — | — | 5.0 | 0.5 | — | 0.90 | 0.05 | — | 0.05 |
| Production example 1-4 | A1-4 | 23.96 | 5.0 | — | — | — | 5.0 | 0.5 | — | 0.20 | 0.05 | — | 0.05 |
| Production example 1-5 | A1-5 | 23.96 | 5.0 | — | — | — | 5.0 | 0.5 | — | 0.30 | 0.05 | — | 0.05 |
| Production example 1-6 | A1-6 | 6.69 | 15.0 | — | — | — | 15.0 | 0.5 | — | 0.30 | 0.05 | — | 0.05 |
| Production example 1-7 | A1-7 | 22.28 | 3.0 | 1.0 | 1.0 | — | 5.0 | 0.5 | — | 0.30 | 0.05 | — | 0.05 |
| Production example 1-8 | A1-8 | 22.28 | 2.0 | 1.0 | 1.0 | 1.0 | 5.0 | 0.5 | — | 0.30 | 0.05 | — | 0.05 |
| Production example 1-9 | A1-9 | 22.01 | 5.0 | — | — | — | 5.0 | 3.0 | — | 0.30 | 0.05 | — | 0.05 |
| Production example 1-10 | A1-10 | 21.12 | 5.0 | — | — | — | 5.0 | 5.0 | — | 0.30 | 0.05 | — | 0.05 |
| Production example 1-11 | A1-11 | 26.17 | 3.0 | — | — | — | 3.0 | 0.5 | — | 0.30 | 0.05 | — | 0.05 |
| Production example 1-12 | A1-12 | 23.96 | 5.0 | — | — | — | 5.0 | 0.5 | — | 0.30 | 0.05 | — | 0.05 |
| Production example 2-1 | A2-1 | 30.06 | 1.0 | — | — | — | 1.0 | 2.0 | — | 0.30 | 0.05 | — | 0.05 |
| Production example 2-2 | A2-2 | 30.42 | 1.0 | — | — | — | 1.0 | 2.0 | — | 0.10 | 0.05 | — | 0.05 |
| Production example 2-3 | A2-3 | 28.93 | 1.0 | — | — | — | 1.0 | 2.0 | — | 0.90 | 0.05 | — | 0.05 |
| Production example 2-4 | A2-4 | 30.06 | 1.0 | — | — | — | 1.0 | 2.0 | — | 0.20 | 0.05 | — | 0.05 |
| Production example 2-5 | A2-5 | 30.06 | 1.0 | — | — | — | 1.0 | 2.0 | — | 0.30 | 0.05 | — | 0.05 |
| Production example 2-6 | A2-6 | 28.06 | 3.0 | — | — | — | 3.0 | 2.0 | — | 0.30 | 0.05 | — | 0.05 |
| Production example 2-7 | A2-7 | 30.62 | 1.0 | — | — | — | 1.0 | 2.0 | — | 0.30 | 0.05 | — | 0.05 |
| Production example 2-8 | A2-8 | 30.61 | 1.0 | — | — | — | 1.0 | 2.0 | — | 0.30 | 0.05 | — | 0.05 |
| Production example 2-9 | A2-9 | 31.01 | 1.0 | — | — | — | 1.0 | — | 2.0 | 0.30 | 0.05 | — | 0.05 |
| Production example 2-10 | A2-10 | 10.56 | 1.0 | — | — | — | 1.0 | 15.0 | — | 0.30 | 0.05 | — | 0.05 |
| Production example 2-11 | A2-11 | 30.06 | 1.0 | — | — | — | 1.0 | 2.0 | — | 0.30 | 0.05 | — | 0.05 |
| Comparative production example 1 | B-1 | 24.18 | 5.0 | — | — | — | 5.0 | — | — | 0.30 | 0.05 | — | 0.05 |
| Comparative production example 2 | B-2 | 31.45 | — | — | — | — | — | 1.5 | — | 0.30 | 0.05 | — | 0.05 |

TABLE 2-continued

| | | | | | | | | | | | | |
|---|---|---|---|---|---|---|---|---|---|---|---|---|
| Comparative production example 3 | B-3 | 21.87 | 5.0 | — | — | — | 5.0 | 1.0 | — | 1.00 | 0.05 | 0.10 | 0.15 |
| Comparative production example 4 | B-4 | 23.1 | 5.0 | — | — | — | 5.0 | 1.0 | — | 0.30 | — | — | — |
| Comparative production example 5 | B-5 | 24.42 | 5.0 | — | — | — | 5.0 | 0.5 | — | — | 0.05 | — | 0.05 |

| | | Monomer composition (mol %) Monomer mixed solution (II) | | | | | | | | | | |
|---|---|---|---|---|---|---|---|---|---|---|---|---|
| | | | (a2) | | | | | (a3) | | | (a4) | |
| | Symbol | AM | DM | DML | BQ | APDM | Total | IA | AA | SMAS | DMAA | MBAA | Total |
| Production example 1-1 | A1-1 | 66.93 | 1.0 | — | — | — | 1.0 | 2.0 | — | 0.20 | 0.05 | 0.01 | 0.06 |
| Production example 1-2 | A1-2 | 66.77 | 1.0 | — | — | — | 1.0 | 2.0 | — | 0.20 | 0.05 | 0.01 | 0.06 |
| Production example 1-3 | A1-3 | 67.52 | 1.0 | — | — | — | 1.0 | 2.0 | — | 0.10 | 0.05 | 0.05 | 0.1 |
| Production example 1-4 | A1-4 | 66.93 | 1.0 | — | — | — | 1.0 | 2.0 | — | 0.10 | 0.05 | 0.01 | 0.06 |
| Production example 1-5 | A1-5 | 66.93 | 1.0 | — | — | — | 1.0 | 2.0 | — | 0.20 | 0.05 | 0.01 | 0.06 |
| Production example 1-6 | A1-6 | 72.2 | 3.0 | — | — | — | 3.0 | 2.0 | — | 0.20 | 0.05 | 0.01 | 0.06 |
| Production example 1-7 | A1-7 | 68.61 | 3.0 | 1.0 | 1.0 | — | 5.0 | 2.0 | — | 0.20 | 0.05 | 0.01 | 0.06 |
| Production example 1-8 | A1-8 | 68.61 | 2.0 | 1.0 | 1.0 | 1.0 | 5.0 | 2.0 | — | 0.20 | 0.05 | 0.01 | 0.06 |
| Production example 1-9 | A1-9 | 59.38 | 1.0 | — | — | — | 1.0 | 9.0 | — | 0.20 | 0.05 | 0.01 | 0.06 |
| Production example 1-10 | A1-10 | 50.27 | 1.0 | — | — | — | 1.0 | 17.0 | — | 0.20 | 0.05 | 0.01 | 0.06 |
| Production example 1-11 | A1-11 | 64.72 | 3.0 | — | — | — | 3.0 | 2.0 | — | 0.20 | 0.05 | 0.01 | 0.06 |
| Production example 1-12 | A1-12 | 33.61 | 0.5 | — | — | — | 0.5 | 1.0 | — | 0.10 | 0.03 | — | 0.03 |
| Production example 2-1 | A2-1 | 60.83 | 5.0 | — | — | — | 5.0 | 0.5 | — | 0.20 | 0.05 | 0.01 | 0.06 |
| Production example 2-2 | A2-2 | 60.67 | 5.0 | — | — | — | 5.0 | 0.5 | — | 0.20 | 0.05 | 0.01 | 0.06 |
| Production example 2-3 | A2-3 | 61.42 | 5.0 | — | — | — | 5.0 | 0.5 | — | 0.10 | 0.05 | 0.05 | 0.1 |
| Production example 2-4 | A2-4 | 60.83 | 5.0 | — | — | — | 5.0 | 0.5 | — | 0.10 | 0.05 | 0.01 | 0.06 |
| Production example 2-5 | A2-5 | 60.83 | 5.0 | — | — | — | 5.0 | 0.5 | — | 0.20 | 0.05 | 0.01 | 0.06 |
| Production example 2-6 | A2-6 | 56.83 | 9.0 | — | — | — | 9.0 | 0.5 | — | 0.20 | 0.05 | 0.01 | 0.06 |
| Production example 2-7 | A2-7 | 60.27 | 3.0 | 1.0 | 1.0 | — | 5.0 | 0.5 | — | 0.20 | 0.05 | 0.01 | 0.06 |
| Production example 2-8 | A2-8 | 60.28 | 2.0 | 1.0 | 1.0 | 1.0 | 5.0 | 0.5 | — | 0.20 | 0.05 | 0.01 | 0.06 |
| Production example 2-9 | A2-9 | 59.88 | 5.0 | — | — | — | 5.0 | — | 0.5 | 0.20 | 0.05 | 0.01 | 0.06 |
| Production example 2-10 | A2-10 | 64.83 | 5.0 | — | — | — | 5.0 | 3.0 | — | 0.20 | 0.05 | 0.01 | 0.06 |
| Production example 2-11 | A2-11 | 30.56 | 2.5 | — | — | — | 2.5 | 0.25 | — | 0.10 | 0.03 | — | 0.03 |
| Comparative production example 1 | B-1 | 69.21 | 1.0 | — | — | — | 1.0 | — | — | 0.20 | 0.05 | 0.01 | 0.06 |
| Comparative production example 2 | B-2 | 62.94 | — | — | — | — | — | 3.5 | — | 0.20 | 0.05 | 0.01 | 0.06 |
| Comparative production example 3 | B-3 | 67.78 | 1.0 | — | — | — | 1.0 | 1.5 | — | 0.50 | 0.05 | 0.15 | 0.20 |
| Comparative production example 4 | B-4 | 67.9 | 1.0 | — | — | — | 1.0 | 1.5 | — | 0.20 | — | — | — |
| Comparative production example 5 | B-5 | 66.98 | 1.0 | — | — | — | 1.0 | 2.0 | — | — | 0.05 | — | 0.05 |

| | | Monomer composition (mol %) Monomer mixed solution (III) | | | | | | |
|---|---|---|---|---|---|---|---|---|
| | | (a2) | | (a3) | | (a4) | | |
| | Symbol | AM | DM | IA | SMAS | DMAA | MBAA | Total |
| Production example 1-1 | A1-1 | | | | | | | |
| Production example 1-2 | A1-2 | | | | | | | |
| Production example 1-3 | A1-3 | | | | | | | |
| Production example 1-4 | A1-4 | | | | | | | |
| Production example 1-5 | A1-5 | | | | | | | |
| Production example 1-6 | A1-6 | | | | | | | |
| Production example 1-7 | A1-7 | | | | | | | |
| Production example 1-8 | A1-8 | | | | | | | |
| Production example 1-9 | A1-9 | | | | | | | |
| Production example 1-10 | A1-10 | | | | | | | |
| Production example 1-11 | A1-11 | | | | | | | |
| Production example 1-12 | A1-12 | 33.33 | 0.50 | 1.0 | 0.10 | 0.02 | 0.01 | 0.03 |
| Production example 2-1 | A2-1 | | | | | | | |
| Production example 2-2 | A2-2 | | | | | | | |
| Production example 2-3 | A2-3 | | | | | | | |
| Production example 2-4 | A2-4 | | | | | | | |
| Production example 2-5 | A2-5 | | | | | | | |
| Production example 2-6 | A2-6 | | | | | | | |
| Production example 2-7 | A2-7 | | | | | | | |
| Production example 2-8 | A2-8 | | | | | | | |
| Production example 2-9 | A2-9 | | | | | | | |
| Production example 2-10 | A2-10 | | | | | | | |

TABLE 2-continued

| | | | | | | | | |
|---|---|---|---|---|---|---|---|---|
| Production example 2-11 | A2-11 | 30.28 | 2.5 | 0.25 | 0.10 | 0.02 | 0.01 | 0.03 |
| Comparative production example 1 | B-1 | | | | | | | |
| Comparative production example 2 | B-2 | | | | | | | |
| Comparative production example 3 | B-3 | | | | | | | |
| Comparative production example 4 | B-4 | | | | | | | |
| Comparative production example 5 | B-5 | | | | | | | |

TABLE 3

| | Symbol | Weight-average molecular weight (Unit: 10K) | Viscosity immediately after synthesis Concentration (%) | Viscosity (mPa · s) | Viscosity (mPa · s) (pH: 4, concentration: 15%) |
|---|---|---|---|---|---|
| Production example 1-1 | A1-1 | 280 | 20 | 8500 | 2300 |
| Production example 1-2 | A1-2 | 160 | 20 | 8500 | 2300 |
| Production example 1-3 | A1-3 | 890 | 20 | 8600 | 2400 |
| Production example 1-4 | A1-4 | 350 | 15 | 10000 | 10000 |
| Production example 1-5 | A1-5 | 230 | 20 | 5000 | 1500 |
| Production example 1-6 | A1-6 | 250 | 20 | 8500 | 2300 |
| Production example 1-7 | A1-7 | 280 | 20 | 8700 | 2400 |
| Production example 1-8 | A1-8 | 280 | 20 | 8500 | 2300 |
| Production example 1-9 | A1-9 | 320 | 20 | 8500 | 2300 |
| Production example 1-10 | A1-10 | 340 | 20 | 8600 | 2400 |
| Production example 1-11 | A1-11 | 290 | 20 | 8500 | 2300 |
| Production example 1-12 | A1-12 | 320 | 20 | 8500 | 2300 |
| Production example 2-1 | A2-1 | 270 | 20 | 8500 | 2300 |
| Production example 2-2 | A2-2 | 160 | 20 | 8800 | 2500 |
| Production example 2-3 | A2-3 | 910 | 20 | 8500 | 2300 |
| Production example 2-4 | A2-4 | 340 | 15 | 10000 | 10000 |
| Production example 2-5 | A2-5 | 220 | 20 | 5000 | 1500 |
| Production example 2-6 | A2-6 | 260 | 20 | 8500 | 2300 |
| Production example 2-7 | A2-7 | 270 | 20 | 8600 | 2400 |
| Production example 2-8 | A2-8 | 290 | 20 | 8500 | 2300 |
| Production example 2-9 | A2-9 | 300 | 20 | 8500 | 2300 |
| Production example 2-10 | A2-10 | 360 | 20 | 8500 | 2300 |
| Production example 2-11 | A2-11 | 320 | 20 | 8500 | 2300 |
| Comparative production example 1 | B-1 | 290 | 20 | 8500 | 2300 |
| Comparative production example 2 | B-2 | 320 | 20 | 8500 | 2300 |
| Comparative production example 3 | B-3 | 1250 | 20 | 8500 | 2300 |
| Comparative production example 4 | B-4 | 185 | 20 | 3400 | 1000 |
| Comparative production example 5 | B-5 | 85 | 20 | 8300 | 2250 |

Influence of Weight Ratio of Each Polymer (1) (Viscosity of Polymer (1) and Viscosity of Polymer (2) are the Same)>

Examples 1 to 5, Comparative Examples 1 to 2

The polymer (A1-1) and the polymer (A2-1) were added in the weight ratios shown in Table 4 and mixed to obtain a paper-strengthening agent (A), respectively.
<Viscosity of Paper-Strengthening Agent (A), Polymer (A1) and Polymer (A2)>

Using a B-type viscometer (manufactured by Toki Sangyo Co., Ltd.), a viscosity of the paper-strengthening agent at a temperature of 25° C. was measured, which value was defined as $X_A$ (hereinafter, also referred to as a measured value $X_A$). Moreover, a viscosity (pH: 4, concentration: 15%) of the polymer (A1) shown in Table 4 was defined as $X_{A1}$, and a viscosity (pH: 4, concentration: 15%) of the polymer (A2) was defined as $X_{A2}$.

Besides, an arithmetic mean value of the viscosity of the polymer (A1) and the viscosity of the polymer (A2) was calculated from (Equation 2).

$$\text{(Arithmetic mean value)} = m_{A1} \times X_{A1} + m_{A2} \times X_{A2} \quad \text{(Equation 2)}$$

($m_{A1}$ is a ratio of a solid content weight of the polymer (A1) to a total weight of the polymer (A1) and the polymer (A2), $m_{A2}$ is a ratio of a solid content weight of the polymer (A2) to the total weight of the polymer (A1) and the polymer (A2), and $m_{A1} + m_{A2} = 1$.)

In this evaluation, (measured value $X_A$)/(arithmetic mean value) was used as a value. The results are shown in Table 4.

<Preparation of Paper-Strengthening Agent for Evaluation on Papermaking>

Each paper-strengthening agent (A) shown in Table 4 was diluted by adding a deionized water so as to have a solid content concentration of 1.0%. Then, the following evaluation on papermaking was performed.

(Evaluation on Papermaking)

A waste corrugated fiberboard was beaten with a Niagara beater, and calcium chloride was added to a pulp slurry adjusted to have 350 ml of Canadian Standard Freeness (C.S.F) to adjust an electrical conductivity to 4.0 mS/cm. An alum (aluminum sulfate) was added to this slurry liquid in a solid content of 1.0% based on a solid content weight of the pulp slurry, and then paper-strengthening agent (A) shown in Table 4 was added in a solid content of 0.5% based on the solid content weight of the pulp slurry. The pH of each pulp slurry was adjusted to 6.5. The slurry was dehydrated with a tappi sheet machine and pressed at 5 kg/cm$^2$ for 2 minutes for papermaking with a basis weight of 150 g/m$^2$. Next, the paper was dried in a rotary dryer at 105° C. for 4 minutes and subjected to humidity control for 24 hours under a condition of a temperature at 23° C. and a humidity of 50%, and then a specific burst strength was measured. Besides, electrical conductivity and specific burst strength were measured by the following methods. The results are shown in Table 4.

<Electrical Conductivity>

An electrical conductivity was measured using pH/COND METER D-54 (manufactured by HORIBA, Ltd.).

<Freeness>

The freeness was measured according to JIS P 8121 using Canadian Standard Freeness (C.S.F).

<Specific Burst Strength>

Using the paper obtained above, a specific burst strength (kPa·m$^2$/g) was measured according to JIS P 8131.

TABLE 4

|  | Polymer (1) | | Polymer (2) | | |
| --- | --- | --- | --- | --- | --- |
|  | No. | Viscosity $X_{A1}$ (pH: 4, concentration: 15%) (mPa·s) | No. | Viscosity $X_{A2}$ (pH: 4, concentration: 15%) (mPa·s) | Weight ratio (solid content) |
| Example 1 | A1-1 | 2300 | A2-1 | 2300 | 90/10 |
| Example 2 | A1-1 | 2300 | A2-1 | 2300 | 75/25 |
| Example 3 | A1-1 | 2300 | A2-1 | 2300 | 50/50 |
| Example 4 | A1-1 | 2300 | A2-1 | 2300 | 25/75 |
| Example 5 | A1-1 | 2300 | A2-1 | 2300 | 10/90 |
| Comparative example 1 | A1-1 | 2300 | A2-1 | 2300 | 97/3 |
| Comparative example 2 | A1-1 | 2300 | A2-1 | 2300 | 3/97 |

|  | Viscosity (pH: 4, concentration: 15%) (mPa·s) | | | | |
| --- | --- | --- | --- | --- | --- |
|  | Measured value $X_A$ (mPa·s) | Arithmetic mean value (mPa·s) | Measured value $X_A$/arithmetic mean value | Freeness (mL) | Specific burst strength (kPa·m$^2$/g) |
| Example 1 | 3000 | 2300 | 1.30 | 388 | 3.20 |
| Example 2 | 4750 | 2300 | 2.07 | 397 | 3.25 |
| Example 3 | 6000 | 2300 | 2.61 | 411 | 3.26 |
| Example 4 | 4900 | 2300 | 2.13 | 385 | 3.19 |
| Example 5 | 3200 | 2300 | 1.39 | 382 | 3.16 |
| Comparative example 1 | 2490 | 2300 | 1.08 | 383 | 3.14 |
| Comparative example 2 | 2500 | 2300 | 1.09 | 378 | 3.12 |

<Influence of Weight Ratio of Each Polymer (2) (Viscosity of Polymer (1) And Viscosity of Polymer (2) are the Same)>

Examples 6-10

The polymer (A1-4) and the polymer (A2-4) were added in the weight ratios shown in Table 5 and mixed to obtain a paper-strengthening agent (A), respectively. A viscosity measurement and evaluation on papermaking with each paper-strengthening agent were performed in the similar manner as in the above-described method. The results are shown in Table 5.

TABLE 5

|  | Polymer (1) | | Polymer (2) | | |
| --- | --- | --- | --- | --- | --- |
|  | No. | Viscosity $X_{A1}$ (pH: 4, concentration: 15%) (mPa · s) | No. | Viscosity $X_{A2}$ (pH: 4, concentration: 15%) (mPa · s) | Weight ratio (solid content) |
| Example 6 | A1-4 | 10000 | A2-4 | 10000 | 90/10 |
| Example 7 | A1-4 | 10000 | A2-4 | 10000 | 75/25 |
| Example 8 | A1-4 | 10000 | A2-4 | 10000 | 50/50 |
| Example 9 | A1-4 | 10000 | A2-4 | 10000 | 25/75 |
| Example 10 | A1-4 | 10000 | A2-4 | 10000 | 10/90 |

|  | Viscosity (pH: 4, concentration: 15%) (mPa · s) | | | | |
| --- | --- | --- | --- | --- | --- |
|  | Measured value $X_A$ (mPa · s) | Arithmetic mean value (mPa · s) | Measured value $X_A$/arithmetic mean value | Freeness (mL) | Specific burst strength (kPa · m$^2$/g) |
| Example 6 | 19000 | 10000 | 1.90 | 498 | 3.28 |
| Example 7 | 33500 | 10000 | 3.35 | 545 | 3.24 |
| Example 8 | 41500 | 10000 | 4.15 | 597 | 3.19 |
| Example 9 | 35000 | 10000 | 3.50 | 559 | 3.23 |
| Example 10 | 21000 | 10000 | 2.10 | 505 | 3.27 |

<Influence of Weight-Average Molecular Weight of Each Polymer>

Examples 11-19, Comparative Examples 3-9

The polymer (A1) and the polymer (A2) each having a different weight-average molecular weight were added in the weight ratios shown in Table 6 and mixed to obtain a paper-strengthening agent, respectively. A viscosity measurement and evaluation on papermaking with each paper-strengthening agent were performed in the similar manner as in the above-described method. The results are shown in Table 6.

TABLE 6

|  | Polymer (1) | | Polymer (2) | | |
| --- | --- | --- | --- | --- | --- |
|  | No. | Viscosity $X_{A1}$ (pH: 4, concentration: 15%) (mPa · s) | No. | Viscosity $X_{A2}$ (pH: 4, concentration: 15%) (mPa · s) | Weight ratio (solid content) |
| Example 11 | A1-1 | 2300 | A2-1 | 2300 | 50/50 |
| Example 12 | A1-1 | 2300 | A2-2 | 2500 | 50/50 |
| Example 13 | A1-1 | 2300 | A2-3 | 2300 | 50/50 |
| Example 14 | A1-2 | 2300 | A2-1 | 2300 | 50/50 |
| Example 15 | A1-2 | 2300 | A2-2 | 2500 | 50/50 |
| Example 16 | A1-2 | 2300 | A2-3 | 2300 | 50/50 |
| Example 17 | A1-3 | 2400 | A2-1 | 2300 | 50/50 |
| Example 18 | A1-3 | 2400 | A2-2 | 2500 | 50/50 |
| Example 19 | A1-3 | 2400 | A2-3 | 2300 | 50/50 |
| Comparative example 3 | A1-1 | 2300 |  | — | 100/0 |
| Comparative example 4 | A1-2 | 2300 |  | — | 100/0 |
| Comparative example 5 | A1-3 | 2400 |  | — | 100/0 |

TABLE 6-continued

| | | | | | |
|---|---|---|---|---|---|
| Comparative example 6 | — | | A2-1 | 2300 | 0/100 |
| Comparative example 7 | — | | A2-2 | 2500 | 0/100 |
| Comparative example 8 | — | | A2-3 | 2300 | 0/100 |
| Comparative example 9 | A1-1 | 2300 | A1-2 | 2300 | 50/50 |

| | Viscosity (pH: 4, concentration: 15%) (mPa · s) | | | | |
|---|---|---|---|---|---|
| | Measured value $X_A$ (mPa · s) | Arithmetic mean value (mPa · s) | Measured value $X_A$/arithmetic mean value | Freeness (mL) | Specific burst strength (kPa · m$^2$/g) |
| Example 11 | 6000 | 2300 | 2.61 | 411 | 3.26 |
| Example 12 | 5700 | 2400 | 2.38 | 395 | 3.24 |
| Example 13 | 6300 | 2300 | 2.74 | 437 | 3.31 |
| Example 14 | 5850 | 2300 | 2.54 | 389 | 3.23 |
| Example 15 | 5300 | 2400 | 2.21 | 375 | 3.22 |
| Example 16 | 6100 | 2300 | 2.65 | 411 | 3.28 |
| Example 17 | 6300 | 2350 | 2.68 | 449 | 3.32 |
| Example 18 | 6250 | 2450 | 2.55 | 410 | 3.26 |
| Example 19 | 6700 | 2350 | 2.85 | 443 | 3.35 |
| Comparative example 3 | 2300 | 2300 | — | 381 | 3.14 |
| Comparative example 4 | 2300 | 2300 | — | 367 | 3.08 |
| Comparative example 5 | 2400 | 2400 | — | 395 | 3.18 |
| Comparative example 6 | 2300 | 2300 | — | 376 | 3.10 |
| Comparative example 7 | 2500 | 2500 | — | 365 | 3.04 |
| Comparative example 8 | 2300 | 2300 | — | 393 | 3.14 |
| Comparative example 9 | 2350 | 2300 | 1.02 | 376 | 3.11 |

<Influence of Weight Ratio of Each Polymer (3) (Viscosity of Polymer (1) and Viscosity of Polymer (2) are Different)>

Examples 20 to 24, Comparative Example 11

The polymer (A1-4) and the polymer (A2-1) were added in the weight ratios shown in Table 7 and mixed to obtain a paper-strengthening agent (A), respectively. A viscosity measurement and evaluation on papermaking with each paper-strengthening agent were performed in the similar manner as in the above-described method. The results are shown in Table 7.

TABLE 7

| | Polymer (1) | | Polymer (2) | | |
|---|---|---|---|---|---|
| | No. | Viscosity $X_{A1}$ (pH: 4, concentration: 15%) (mPa · s) | No. | Viscosity $X_{A2}$ (pH: 4, concentration: 15%) (mPa · s) | Weight ratio (solid content) |
| Example 20 | A1-4 | 10000 | A2-1 | 2300 | 90/10 |
| Example 21 | A1-4 | 10000 | A2-1 | 2300 | 75/25 |
| Example 22 | A1-4 | 10000 | A2-1 | 2300 | 50/50 |
| Example 23 | A1-4 | 10000 | A2-1 | 2300 | 25/75 |
| Example 24 | A1-4 | 10000 | A2-1 | 2300 | 10/90 |
| Comparative example 11 | A1-4 | 10000 | A2-1 | 2300 | 2/98 |

| | Viscosity (pH: 4, concentration: 15%) (mPa · s) | | | | |
|---|---|---|---|---|---|
| | Measured value $X_A$ (mPa · s) | Arithmetic mean value (mPa · s) | Measured value $X_A$/arithmetic mean value | Freeness (mL) | Specific burst strength (kPa · m$^2$/g) |
| Example 20 | 14000 | 9230 | 1.52 | 467 | 3.27 |
| Example 21 | 17300 | 8075 | 2.14 | 484 | 3.26 |

TABLE 7-continued

| | | | | | |
|---|---|---|---|---|---|
| Example 22 | 16100 | 6150 | 2.62 | 464 | 3.28 |
| Example 23 | 8900 | 4225 | 2.11 | 434 | 3.23 |
| Example 24 | 4500 | 3070 | 1.47 | 410 | 3.19 |
| Comparative example 10 | 10500 | 9769 | 1.07 | 441 | 3.19 |
| Comparative example 11 | 2730 | 2531 | 1.08 | 389 | 3.15 |

<Influence of Changing of Type of Polymer (A1)>

Examples 25 to 33, Comparative Examples 12 to 20

The polymer (A1-4) and the polymer (A2-1) were mixed in the weight ratios shown in Table 8 to obtain a paper-strengthening agent, respectively. Moreover, the polymer (A1-5) to the polymer (A1-12) were mixed in the similar manner to obtain paper-strengthening agents. A viscosity measurement and evaluation on papermaking with each paper-strengthening agent were performed in the similar manner as in the above-described method. Moreover, as a comparison, only the polymer (A1-4) to the polymer (A1-12) were used for evaluation in the similar manner. The results are shown in Table 8.

TABLE 8

| | Polymer (1) | | Polymer (2) | | |
|---|---|---|---|---|---|
| | No. | Viscosity $X_{A1}$ (pH: 4, concentration: 15%) (mPa·s) | No. | Viscosity $X_{A2}$ (pH: 4, concentration: 15%) (mPa·s) | Weight ratio (solid content) |
| Example 25 | A1-4 | 10000 | A2-1 | 2300 | 50/50 |
| Example 26 | A1-5 | 1500 | A2-1 | 2300 | 50/50 |
| Example 27 | A1-6 | 2300 | A2-1 | 2300 | 50/50 |
| Example 28 | A1-7 | 2400 | A2-1 | 2300 | 50/50 |
| Example 29 | A1-8 | 2300 | A2-1 | 2300 | 50/50 |
| Example 30 | A1-9 | 2300 | A2-1 | 2300 | 50/50 |
| Example 31 | A1-10 | 2400 | A2-1 | 2300 | 50/50 |
| Example 32 | A1-11 | 2300 | A2-1 | 2300 | 50/50 |
| Example 33 | A1-12 | 2300 | A2-1 | 2300 | 50/50 |
| Comparative example 12 | A1-4 | 10000 | — | | 100/0 |
| Comparative example 13 | A1-5 | 1500 | — | | 100/0 |
| Comparative example 14 | A1-6 | 2300 | — | | 100/0 |
| Comparative example 15 | A1-7 | 2400 | — | | 100/0 |
| Comparative example 16 | A1-8 | 2300 | — | | 100/0 |
| Comparative example 17 | A1-9 | 2300 | — | | 100/0 |
| Comparative example 18 | A1-10 | 2400 | — | | 100/0 |
| Comparative example 19 | A1-11 | 2300 | — | | 100/0 |
| Comparative example 20 | A1-12 | 2300 | — | | 100/0 |

| | Viscosity at pH of 4.0 (mPa·s) | | | | |
|---|---|---|---|---|---|
| | Measured value $X_A$ (mPa·s) | Arithmetic mean value (mPa·s) | Measured value $X_A$/arithmetic mean value | Freeness (mL) | Specific burst strength (kPa·m²/g) |
| Example 25 | 16100 | 6150 | 2.62 | 464 | 3.28 |
| Example 26 | 4700 | 1900 | 2.47 | 392 | 3.24 |
| Example 27 | 5400 | 2300 | 2.35 | 420 | 3.21 |
| Example 28 | 6350 | 2350 | 2.70 | 414 | 3.27 |
| Example 29 | 6350 | 2300 | 2.76 | 416 | 3.28 |
| Example 30 | 8000 | 2300 | 3.48 | 463 | 3.34 |
| Example 31 | 13800 | 2350 | 5.87 | 514 | 3.19 |

TABLE 8-continued

|  | | | | | |
|---|---|---|---|---|---|
| Example 32 | 2800 | 2300 | 1.22 | 356 | 3.18 |
| Example 33 | 6400 | 2300 | 2.78 | 418 | 3.28 |
| Comparative example 12 | 10000 | 10000 | — | 430 | 3.18 |
| Comparative example 13 | 1500 | 1500 | — | 372 | 3.10 |
| Comparative example 14 | 2300 | 2300 | — | 399 | 3.07 |
| Comparative example 15 | 2400 | 2400 | — | 385 | 3.15 |
| Comparative example 16 | 2300 | 2300 | — | 390 | 3.16 |
| Comparative example 17 | 2300 | 2300 | — | 411 | 3.17 |
| Comparative example 18 | 2400 | 2400 | — | 442 | 3.14 |
| Comparative example 19 | 2300 | 2300 | — | 354 | 3.11 |
| Comparative example 20 | 2300 | 2300 | — | 397 | 3.15 |

<Influence of Changing of Type of Polymer (A2)>

Examples 34 to 41, Comparative Examples 21 to 28

The polymer (A1-1) and the polymer (A2-4) were mixed in the weight ratios shown in Table 9 to obtain a paper-strengthening agent, respectively. Moreover, the polymer (A2-5) to the polymer (A2-11) were mixed in the similar manner to obtain paper-strengthening agents. A viscosity measurement and evaluation on papermaking with each paper-strengthening agent were performed in the similar manner as in the above-described method. Moreover, as a comparison, only the polymer (A2-4) to the polymer (A2-11) were used for evaluation in the similar manner. The results are shown in Table 9.

TABLE 9

|  | Polymer (1) | | Polymer (2) | | |
|---|---|---|---|---|---|
|  | No. | Viscosity $X_{A1}$ (pH: 4, concentration: 15%) (mPa · s) | No. | Viscosity $X_{A2}$ (pH: 4, concentration: 15%) (mPa · s) | Weight ratio (solid content) |
| Example 34 | A1-1 | 2300 | A2-4 | 10000 | 50/50 |
| Example 35 | A1-1 | 2300 | A2-5 | 1500 | 50/50 |
| Example 36 | A1-1 | 2300 | A2-6 | 2300 | 50/50 |
| Example 37 | A1-1 | 2300 | A2-7 | 2400 | 50/50 |
| Example 38 | A1-1 | 2300 | A2-8 | 2300 | 50/50 |
| Example 39 | A1-1 | 2300 | A2-9 | 2300 | 50/50 |
| Example 40 | A1-1 | 2300 | A2-10 | 2300 | 50/50 |
| Example 41 | A1-1 | 2300 | A2-11 | 2300 | 50/50 |
| Comparative example 21 | — | — | A2-4 | 10000 | 0/100 |
| Comparative example 22 | — | — | A2-5 | 1500 | 0/100 |
| Comparative example 23 | — | — | A2-6 | 2300 | 0/100 |
| Comparative example 24 | — | — | A2-7 | 2400 | 0/100 |
| Comparative example 25 | — | — | A2-8 | 2300 | 0/100 |
| Comparative example 26 | — | — | A2-9 | 2300 | 0/100 |
| Comparative example 27 | — | — | A2-10 | 2300 | 0/100 |
| Comparative example 28 | — | — | A2-11 | 2300 | 0/100 |

TABLE 9-continued

| | Viscosity at pH of 4.0 (mPa · s) | | | | |
| --- | --- | --- | --- | --- | --- |
| | Measured value $X_A$ (mPa · s) | Arithmetic mean value (mPa · s) | Measured value $X_A$/arithmetic mean value | Freeness (mL) | Specific burst strength (kPa · m²/g) |
| Example 34 | 15900 | 6150 | 2.59 | 459 | 3.28 |
| Example 35 | 4700 | 1900 | 2.47 | 391 | 3.24 |
| Example 36 | 5000 | 2300 | 2.17 | 463 | 3.32 |
| Example 37 | 6300 | 2350 | 2.68 | 407 | 3.27 |
| Example 38 | 6300 | 2300 | 2.74 | 411 | 3.28 |
| Example 39 | 4900 | 2300 | 2.13 | 376 | 3.22 |
| Example 40 | 7050 | 2300 | 3.07 | 457 | 3.18 |
| Example 41 | 6400 | 2300 | 2.78 | 416 | 3.28 |
| Comparative example 21 | 10000 | 10000 | — | 419 | 3.16 |
| Comparative example 22 | 1500 | 1500 | — | 364 | 3.08 |
| Comparative example 23 | 2300 | 2300 | — | 449 | 3.14 |
| Comparative example 24 | 2400 | 2400 | — | 387 | 3.11 |
| Comparative example 25 | 2300 | 2300 | — | 390 | 3.12 |
| Comparative example 26 | 2300 | 2300 | — | 350 | 3.08 |
| Comparative example 27 | 2300 | 2300 | — | 454 | 3.07 |
| Comparative example 28 | 2300 | 2300 | — | 404 | 3.12 |

<Influence of Polymer (B) in Comparative Production Example>

Comparative Examples 30 to 34

Using the polymer (B-1) to the polymer (B-5), two types of polymers shown in Table 10 were added in the predetermined weight ratios and mixed to obtain a paper-strengthening agent, respectively. A viscosity measurement and evaluation on papermaking with each paper-strengthening agent were performed in the similar manner as in the above-described method. The results are shown in Table 10.

TABLE 10

| | Polymer (1) | | Polymer (2) | | |
| --- | --- | --- | --- | --- | --- |
| | No. | Viscosity $X_{A1}$ (pH: 4, concentration: 15%) (mPa · s) | No. | Viscosity $X_{A2}$ (pH: 4, concentration: 15%) (mPa · s) | Weight ratio (solid content) |
| Comparative example 30 | B-3 | 2300 | A2-1 | 2300 | 50/50 |
| Comparative example 31 | B-4 | 1000 | A2-1 | 2300 | 50/50 |
| Comparative example 32 | B-5 | 2250 | A2-1 | 2300 | 50/50 |
| Comparative example 33 | A1-1 | 2300 | B-2 | 2300 | 50/50 |
| Comparative example 34 | B-1 | 2300 | B-2 | 2300 | 50/50 |

| | Viscosity at pH of 4.0 (mPa · s) | | | | |
| --- | --- | --- | --- | --- | --- |
| | Measured value $X_A$ (mPa · s) | Arithmetic mean value (mPa · s) | Measured value $X_A$/arithmetic mean value | Freeness (mL) | Specific burst strength (kPa · m²/g) |
| Comparative example 29 | 5600 | 2300 | 2.43 | 376 | 2.89 |
| Comparative example 30 | 11400 | 2300 | 4.96 | 568 | 2.93 |
| Comparative example 31 | 3100 | 1650 | 1.88 | 382 | 3.13 |

TABLE 10-continued

| | | | | | |
|---|---|---|---|---|---|
| Comparative example 32 | 5000 | 2275 | 2.20 | 368 | 3.09 |
| Comparative example 33 | 5500 | 2300 | 2.39 | 375 | 2.90 |
| Comparative example 34 | 10300 | 2300 | 4.48 | 566 | 2.88 |

<Evaluation in Papermaking Environment with Low Electrical Conductivity>

Examples 42 to 46, Comparative Examples 35 to 36

The similar evaluation was performed using a pulp slurry in which calcium chloride was added to adjust an electrical conductivity to 1.0 mS/cm in the above-described evaluation on papermaking. Besides, as paper-strengthening agents, those obtained by mixing two types of polymers shown in Table 11 in the predetermined polymerization ratios were used. The results are shown in Table 11.

TABLE 11

| | Polymer (1) | | Polymer (2) | | |
|---|---|---|---|---|---|
| | No. | Viscosity $X_{A1}$ (pH: 4, concentration: 15%) (mPa·s) | No. | Viscosity $X_{A2}$ (pH: 4, concentration: 15%) (mPa·s) | Weight ratio (solid content) |
| Example 42 | A1-1 | 2300 | A2-1 | 2300 | 50/50 |
| Example 43 | A1-2 | 2300 | A2-1 | 2300 | 50/50 |
| Example 44 | A1-3 | 2400 | A2-1 | 2300 | 50/50 |
| Example 45 | A1-4 | 10000 | A2-1 | 2300 | 50/50 |
| Example 46 | A1-5 | 1500 | A2-1 | 2300 | 50/50 |
| Comparative example 35 | A1-1 | 2300 | — | — | 100/0 |
| Comparative example 36 | — | — | A2-1 | 2300 | 0/100 |

| | Viscosity (pH: 4.0, concentration: 15%) (mPa·s) | | | | |
|---|---|---|---|---|---|
| | Measured value $X_A$ (mPa·s) | Arithmetic mean value (mPa·s) | Measured value $X_A$/arithmetic mean value | Freeness (mL) | Specific burst strength (kPa·m²/g) |
| Example 42 | 6000 | 2300 | 2.61 | 450 | 3.24 |
| Example 43 | 5850 | 2300 | 2.54 | 432 | 3.22 |
| Example 44 | 6300 | 2350 | 2.68 | 488 | 3.22 |
| Example 45 | 16100 | 6150 | 2.62 | 522 | 3.19 |
| Example 46 | 4700 | 1900 | 2.47 | 435 | 3.22 |
| Comparative example 35 | 2300 | 2300 | — | 414 | 3.16 |
| Comparative example 36 | 2300 | 2300 | — | 409 | 3.13 |

The invention claimed is:

1. A paper-strengthening agent comprising an amphoteric (meth)acrylamide polymer (A1) and an amphoteric (meth)acrylamide polymer (A2),
wherein each of constituent monomers of the amphoteric (meth)acrylamide polymer (A1) and the amphoteric (meth)acrylamide polymer (A2) comprises (meth)acrylamide (a1), a cationic unsaturated monomer (a2), an anionic unsaturated monomer (a3), and a crosslinkable unsaturated monomer (a4),
wherein each of weight-average molecular weights of the amphoteric (meth)acrylamide polymer (A1) and the amphoteric (meth)acrylamide polymer (A2) is 1,500,000 to 10,000,000, and
wherein, where a viscosity (25° C.) of an aqueous solution (pH: 4) of 15% by mass of paper-strengthening agent is defined as $X_A$ mPa·s, a viscosity (25° C.) of an aqueous solution (pH: 4) Of the amphoteric (meth)acrylamide polymer (A1) with 15% by mass of concentration is defined as $X_{A1}$ mPa·s, and a viscosity (25° C.) of an aqueous solution (pH: 4) of the amphoteric (meth) acrylamide polymer (A2) with 15% by mass of concentration is defined as $X_{A2}$ mPa·s, the paper-strengthening agent satisfies the following inequality 1:

$$1.1 \leq X_A/(m_{A1} \times X_{A1} + m_{A2} \times X_{A2}) \leq 6 \quad \text{(Inequality 1)}$$

wherein, $m_{A1}$ is a ratio of a solid content weight of the amphoteric (meth)acrylamide polymer (A1) to a total weight of the amphoteric (meth)acrylamide polymer (A1) and the amphoteric (meth)acrylamide polymer (A2), $m_{A2}$ is a ratio of a solid content weight of the amphoteric (meth)acrylamide polymer (A2) to the total weight of the amphoteric (meth)acrylamide polymer (A1) and the amphoteric (meth)acrylamide polymer (A2), and $m_{A1}+m_{A2}=1$.

2. The paper-strengthening agent of claim 1, wherein the viscosity $X_A$ is 1,100 to 40,000 mPa·s.

3. The paper-strengthening agent of claim 1, wherein the viscosity $X_{A1}$ is 1,000 to 12,000 mPa·s.

4. The paper-strengthening agent of claim 1, wherein the viscosity $X_{A2}$ is 1,000 to 12,000 mPa·s.

5. A paper obtained by using the paper-strengthening agent of claim 1.

6. A method of producing paper, the method comprising adding the paper-strengthening agent of claim 1 to a pulp slurry.

7. The method of producing paper of claim 6, wherein the pulp slurry has an electrical conductivity of 3 mS/cm or more.

* * * * *